United States Patent [19]
Lindberg et al.

[11] Patent Number: 5,560,325
[45] Date of Patent: Oct. 1, 1996

[54] DEVICE FOR COOLING THE COMPRESSED BRAKE AIR FOR AN INTERNAL COMBUSTION ENGINE

[75] Inventors: Tommy Lindberg, Stockholm; Carl Welinder, Södertälje, both of Sweden

[73] Assignee: Scania CV Aktiebolag, Sweden

[21] Appl. No.: 475,633

[22] Filed: Jun. 7, 1995

[30] Foreign Application Priority Data

Jul. 14, 1994 [SE] Sweden .................................. 9402476

[51] Int. Cl.$^6$ ........................................................ F01P 9/00
[52] U.S. Cl. ...................... 123/41.01; 123/41.49; 188/264 R
[58] Field of Search .................. 123/41.01, 41.31, 123/41.49, 542; 415/177; 188/264 R, 264 A, 264 AA; 165/121

[56] References Cited

U.S. PATENT DOCUMENTS 2,649,082  8/1953  Harbert et al. .................. 123/41.49
4,707,166  11/1987  Khosropour .................... 55/213

FOREIGN PATENT DOCUMENTS 0055461  12/1981  European Pat. Off. .
1519395  3/1968  France .

Primary Examiner—Noah P. Kamen
Attorney, Agent, or Firm—Ostrolenk, Faber, Gerb & Soffen, LLP

[57] ABSTRACT

Device for cooling a medium, preferably compressed air, used for braking a motor vehicle. A fan ring around the fan comprises at least one peripheral cooling duct extending along the fan ring. The duct has at least one inlet connection and at least one outlet connection to the duct for the air to be cooled. The duct is arranged to cool air conveyed through the duct.

19 Claims, 4 Drawing Sheets

DEVICE FOR COOLING THE COMPRESSED BRAKE AIR FOR AN INTERNAL COMBUSTION ENGINE

BACKGROUND OF THE INVENTION

The present invention relates to a device for cooling a fluid of an internal combustion engine, particularly the compressed air used for braking and particularly to a device associated with the fan ring to effect the cooling.

On heavy motor vehicles such as trucks and buses compressed air is used for braking, suspension and other purposes. The air path is generally from an air inlet, through a compressor and then via an air dryer or an alcohol injector to the air tanks. During braking, pressing on the brake pedal opens a valve to depressurize brake chambers for activating the brakes.

The air is heated as it passes through the compressor. To make the air dryer more efficient, where moisture is removed, the air must be cooled. However, it is difficult to find a suitable place for such a cooler as it needs space. Further, no matter which cooling medium is used in the cooler, the cooler will likely disturb and thereby reduce the efficiency of the overall cooling capacity of the vehicle propulsion unit cooling system. That system includes other cooling units, such as the radiator and the charge cooler (which is used to cool the inlet air heated by the turbo compressor before entering the cylinders). This would be undesirable as the cooling capacity of the propulsion unit already is a critical factor when designing a heavy vehicle.

The use of air as the cooling medium for the compressed air cooler is less detrimental to the cooling system capacity than the use of water, which is the other obvious alternative. Nevertheless, when designing the cooling system of the propulsion unit, it is hard to find space for all air cooled heat exchanging components where the air flow is sufficient.

Internal combustion engines that are not used for propelling vehicles may have similar problems, e.g., engines used stationary for running electric generators, or the like.

SUMMARY OF THE INVENTION

It is an object of the present invention to avoid the above mentioned problems of a cooling unit for a fluid, such as compressed air. Another object is to provide a cooling unit that does not take too much space and that does not interfere with the overall cooling capacity of the internal combustion engine cooling system.

The objects are achieved by disposing a cooling duct for the fluid to be cooled in the air flow generated by the radiator cooling fan. The fluid is particularly air, more particularly air for the air braking system and usually compressed air. A fan ring extends around that fan. The duct is formed at, namely in or on the fan ring. The duct has inlet and outlet connections for the flow of the air to be cooled.

Accordingly, a fan is encircled by a fan ring. There is at least one cooling duct, which is preferably peripherally arranged at the duct and encircles the fan. The fan is already present in the engine. It is preferably the fan which generates a sufficient air flow through the engine radiator. The fan ring also serves as an ordinary fan ring arranged to increase the efficiency of the fan. The fan provides a radially directed air flow, which is directed towards the duct in the fan ring, thereby creating a high air exchange.

When the invention is used on a motor vehicle internal combustion engine, the duct is preferably located within the radiator fan ring. Further, it serves to cool a fluid other than the engine coolant. That fluid is preferably compressed air which may be used for the brake supply circuit and the air suspension or other units. This arrangement enables the fluid to be cooled at a location with a high heat exchange and using a device that requires little extra space.

In another preferred embodiment, the duct is endless and is located along the entire periphery of the fan ring. Inlet and outlet connections to the duct located approximately 180° apart achieve a maximum cooling effect.

A drain valve may also be provided at the lowest part of the duct to facilitate draining of water traps caused by humid air.

The fan ring may include several ducts for cooling different fluids, and the media may of course be different than air. The ducts may have several inlet and outlet connections. The fluids may be gaseous as well as liquid.

Other characteristics and advantages of the invention are described below in a description of the preferred embodiment.

DETAILED DESCRIPTION OF THE INVENTION

Figure 1:
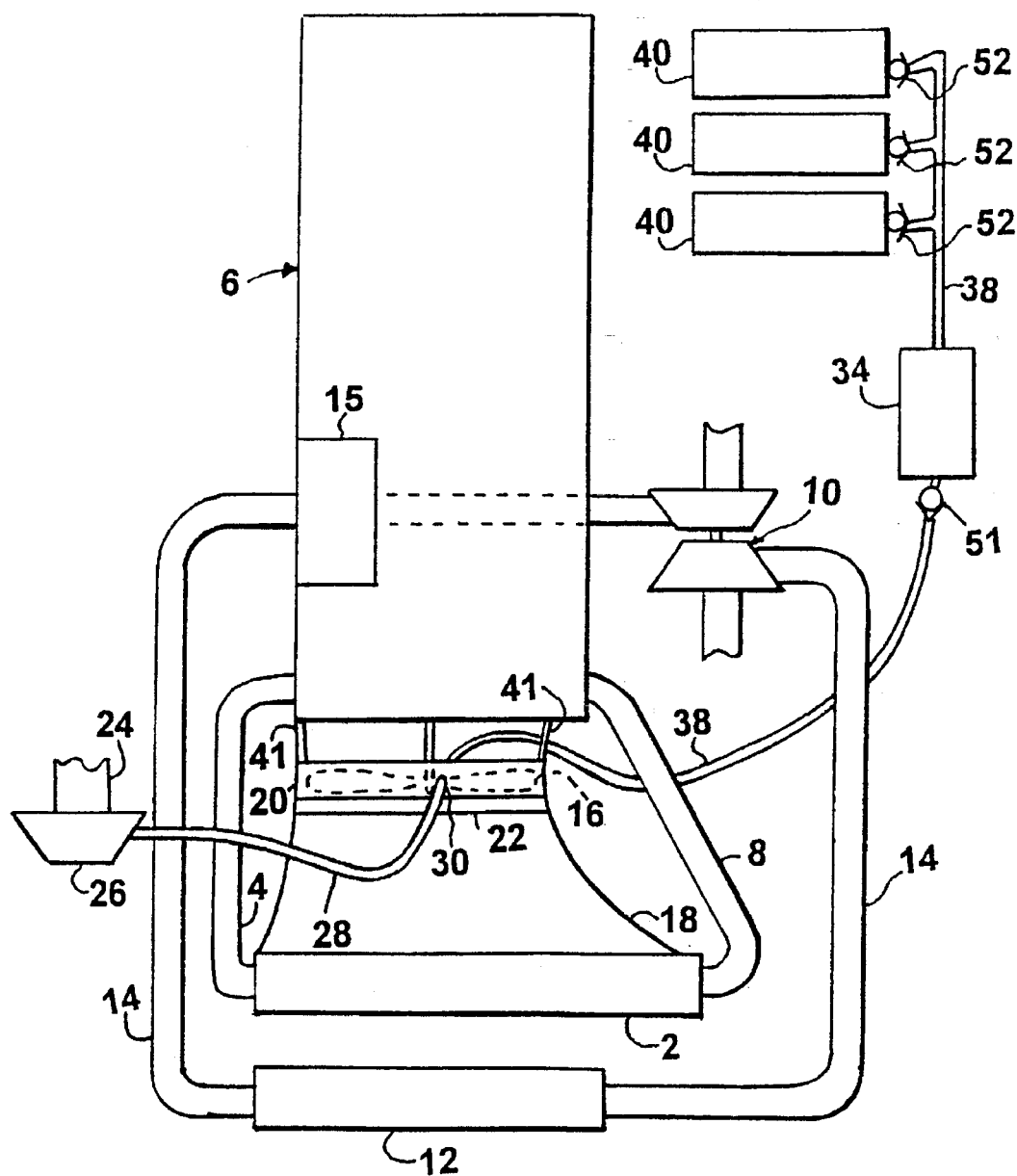
FIG. 1 is a schematic view of components of the cooling system and the brake supply circuit of a truck.

FIG. 1 shows a schematic view of the cooling system and the air supply circuit to the brakes of a motor vehicle.

The cooling system comprises a radiator 2 for cooling a coolant, preferably a water-based fluid. An inlet hose 4 leads the coolant from the radiator to an internal combustion engine 6. An outlet hose 8 leads the heated coolant back to the radiator 2 where it is cooled by air flow through the radiator 2.

The inlet air to the engine is heated as it passes the turbo compressor 10. A charge cooler 12 located on an inlet air duct 14 cools the air before it enters the engine cylinders 15 (only one of which is shown in FIG. 1), as this is favorable for engine performance. The charge cooler 12 is generally located in front of the radiator 2.

A mechanically or electrically driven fan 16 is mounted on the engine 6. It is used when the air flow through the radiator 2 and the charge cooler 12 is insufficient due to lack of wind. In order to get maximum effect from the fan 16, a fan cowling 18 is mounted on the radiator 2 and a fan ring 20 encircles the fan 16, thus forcing the air flow through the radiator 2. Some movement between the fan cowling 18 and the fan ring 20 must be allowed as the fan cowling 18 is mounted to the radiator 2 while the fan ring 20 is mounted to the engine 6. An elastic seal 22 avoids a gap between the ring 20 and cowling 18.

The air supply circuit to the brakes, air suspension and other units comprises an inlet and a filter (not shown in the drawings) followed by a duct 24 leading to a compressor 26. The air is distributed from the compressor 26 through a first hose or pipe 28 to an inlet connection 30 and into a cooling duct 32 in the fan ring 20 according to the invention. The fan ring 20 is exposed to an air flow and is cooled. The cooling capacity rises when the fan 16 is running. As the duct 32 is an integrated part of the fan ring 20, the flowing media within the duct 32 is also cooled. The duct 32 is described below. Air from the duct 32 passes through an outlet connection 36 and a second hose 38 and is distributed to an air dryer 34. A third hose 39 connects the air dryer 34 to several air tanks 40. During braking, as in prior art, the brake pedal (not shown) is pressed down by the vehicle driver. This opens a valve, the brake chambers are depressurized and the brakes are operated.

Nonreturn valves 51,52 on the second and third hoses 38,39, respectively, prevent air leakage.

The air is cooled before leading it into the air dryer 34 to get the maximum effect from the air dryer 34 wherein the air temperature must approximate the ambient temperature.

Figure 2:
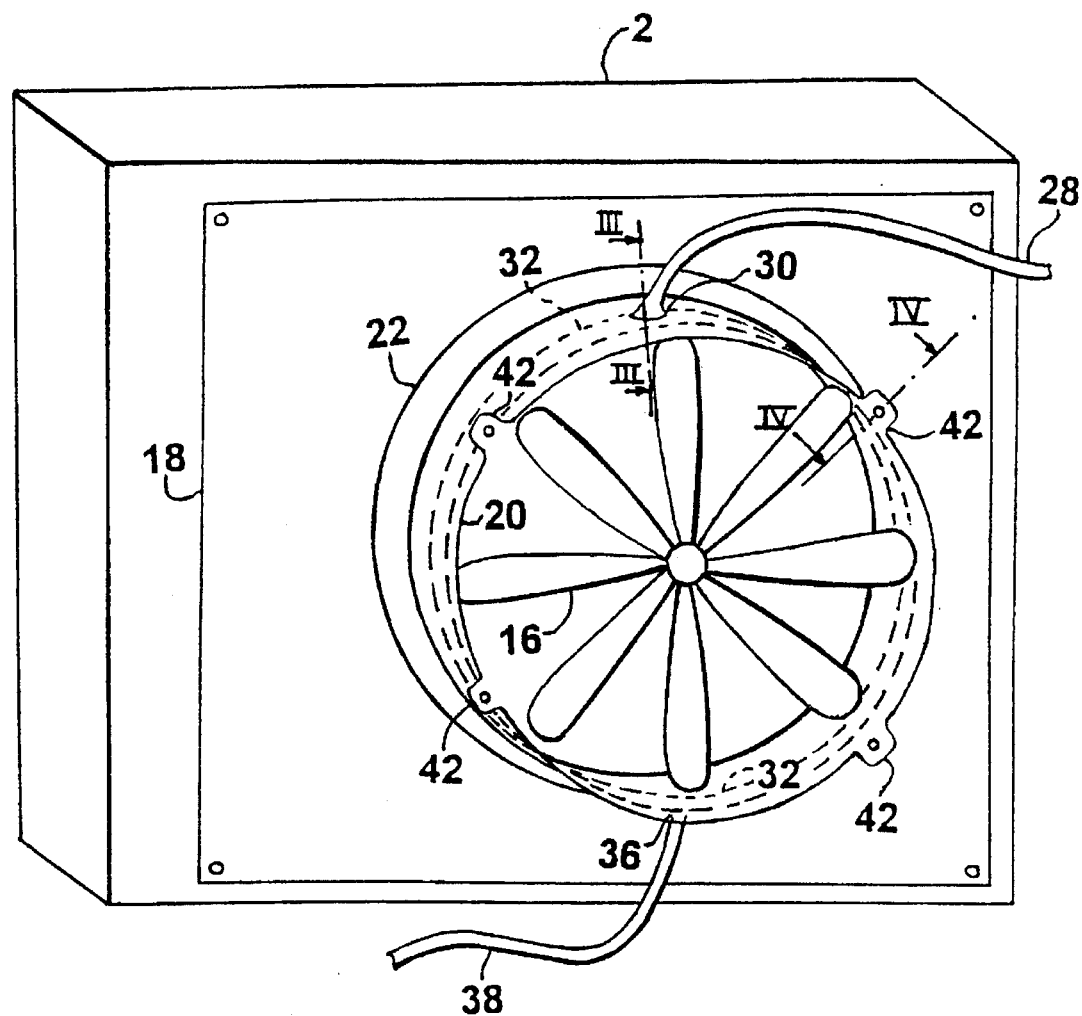
FIG. 2 is a view of the radiator and the fan arrangement.

With reference to FIG. 2 an inlet connection 30 connects the first hose 28 from the compressor 26 to the cooling duct 32 in the fan ring 20. The fan ring 20 is preferably extruded of aluminum or similar material where the duct 32 is an integrated part of the ring. The duct 32 is an endless ring directed along the entire periphery of the fan ring 20. The inlet connection 30 is preferably a suitable known union and it is located in the vicinity of the highest point of the fan ring 20.

The outlet connection 36 is preferably of the same type as the inlet connection 30 and it is located in the vicinity of the lowest point of the fan ring 20. The outlet connection 36 connects the duct 32 with the second hose 38 leading to the air dryer 34.

As the air is humid, there is a risk that liquid traps will occur at the lowest points of the cooling duct 32 or hoses 28,38. The embodiment described above is suitable if the air dryer 34 is located below the lowest part of the fan ring 20 as the hoses 28,38 and duct 32 can then be mounted so as to continuously descend in the air flow direction.

Figure 5:
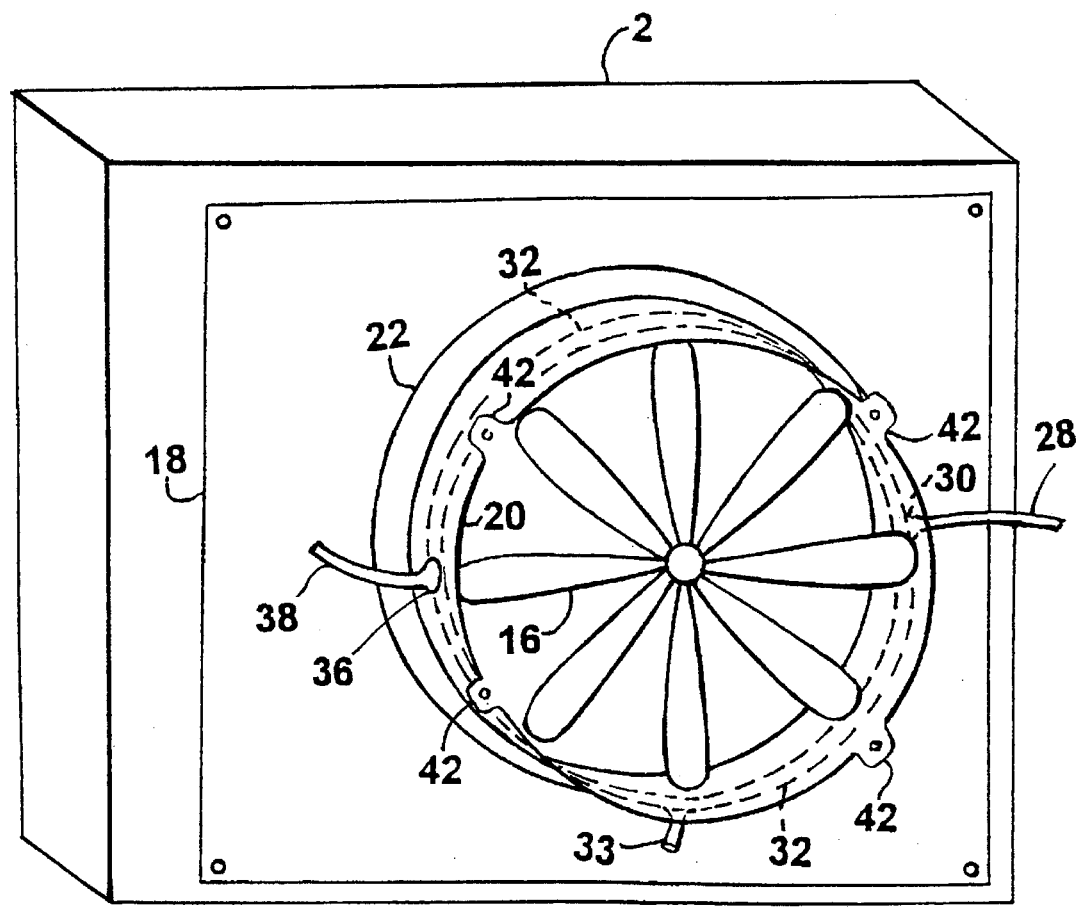
FIG. 5 is a view of second embodiment of the radiator and fan arrangement.

However, if both the compressor 26 and air dryer 34 are located above the lowest part of the fan ring 20, the inlet and outlet connections 30,36 can be located at essentially the same height but approximately 180° apart, as shown in FIG. 5. Thus, the first hose 28 is falling and the second hose 38 rising. The risk of a liquid trap in the lowest part of the duct 32 is then quite high. However, as the upper part of the duct 32 is open, there will still be an open passage between the inlet and outlet connections 30,36. Furthermore, at least one drain valve 33 located at the lowest point can be opened when servicing the vehicle in order to clear the duct 32 from liquid. If it is desired, the drain valve can also be controlled automatically, e.g. to open when the compressor 26 is turned off or when the engine 6 is stopped.

As the inlet and outlet connections 30,36 in the embodiments described are located as far apart as possible, the air will pass over as long a cooling distance as possible.

If there are disadvantages in locating the inlet and outlet connections 30,36 as described above, e.g. due to packaging problems, they may of course be placed at other locations along the fan ring.

Figure 3:
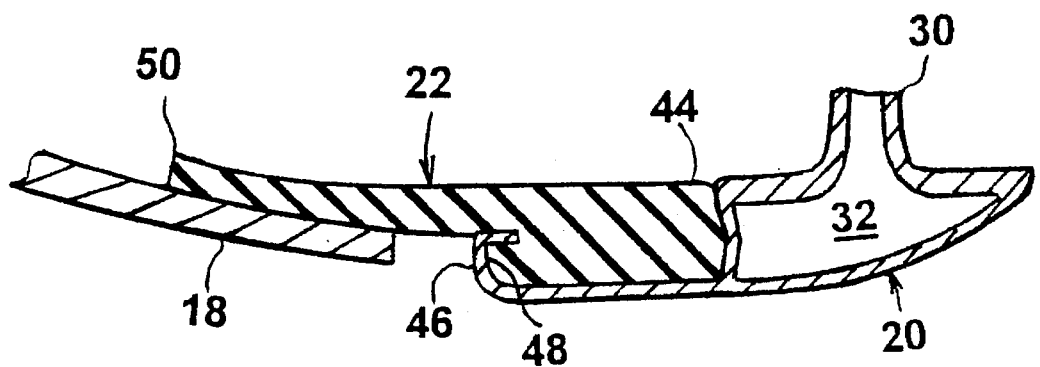
FIG. 3 is a section III—III of FIG. 2 of the fan ring.
Figure 4:
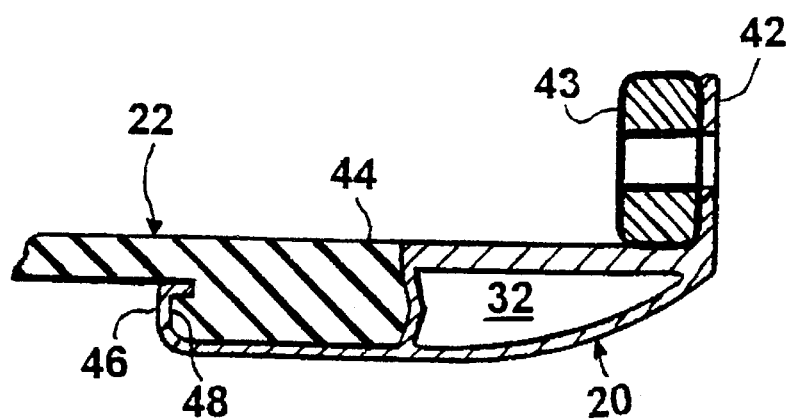
FIG. 4 is a section IV—IV of FIG. 2 of the fan ring.

Sections of the fan ring 20 are shown in FIGS. 3 and 4. The cooling duct 32 is integrated into the fan ring 20 as they are extruded or cast in one piece. The fan ring 20 is mounted to brackets 41 fixed to the engine 6 by a number of screws or bolts (not shown) that pass through flanges 42. If a flange 42 is thin, a thick washer 43 can be used to simplify the mounting. The elastic seal 22 is pressed to the fan ring 20. It is disposed between a rear support 44, which is also the front wall of the duct 32, and a front support 46, which is a bent portion of the ring 20. The front support grips a flange 48 of the seal 22 and thereby secures the seal 22 to the fan ring 20. The front part 50 of the seal 22 is just pressed around to the rear edge of the fan cowling 18. The expressions front and rear are related to the normal travel direction of the vehicle.

In the embodiments described, a first fluid is conveyed through the duct and a second fluid is for the engine cooling system. In one embodiment, the first fluid is compressed air and the second fluid is water-based fluid. The fluids can of course be substituted by other media, and/or both fluids may be of the same medium.

The cooling duct 32 does not require extra space, and it does not interfere with the overall cooling capacity, including the radiator 2 and charge cooler 12. The design is fairly cheap as it only requires two unions and an altered design of the fan ring compared to prior art solutions. Furthermore there is no need for an extra cooling circuit.

There are several further embodiments of the invention. For example, several ducts can be used when cooling of more than one fluid is needed. The fluids may be of different media, such as water and air. There can also be more than one inlet and outlet connection to each duct. The shape of the duct can also be altered. It does not necessarily have to be a straight endless duct. The duct may cover only a part of the fan ring and it may have a different shape, e.g., corrugated, to provide a larger cooling area.

The fan does not necessarily have to be the one used for the radiator. It is possible to use another existing fan having a duct within its fan ring. The invention can also be applied to stationary engines not mounted in vehicles.

The duct may also be part of a unit manufactured separately and mounted to the fan ring when assembling the vehicle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for cooling a first fluid for an internal combustion engine, wherein the engine includes a fan for generating an air flow and a fan ring around the periphery of the fan for directing air flow through the fan; the engine further includes a radiator and connections to the radiator for a second fluid, the fan is arranged to generate air flow over the radiator;

at least one duct located at, extending peripherally around and directed along the fan ring, the duct including an inlet connection to and an outlet connection from the duct, such that the first fluid conveyed along the duct from the inlet connection to the outlet connection may be cooled by the air flow; the radiator and the duct are in respective flow circuits separating the flows of the first and second fluids.

2. The device of claim 1, wherein the duct is integrated into the fan ring.

3. The device of claim 2, wherein the fan ring is extruded including the duct.

4. The device of claim 2, wherein the fan ring is cast to include the duct.

5. The device of claim 1, wherein the duct extends along the entire periphery of the fan ring.

6. The device of claim 5, wherein the duct has essentially the same cross section along its entire length.

7. The device of claim 5, wherein the inlet and outlet connections are located about 180° apart along the periphery of the fan ring.

8. The device of claim 7, wherein the fan ring is oriented vertically having a highest part and a lowest part; the inlet connection is located in the vicinity of the highest part of the ring while the outlet connection is located in the vicinity of the lowest part of the ring.

9. The device of claim 7, wherein the inlet and outlet connections are essentially at the same height relative to the fan ring;

a drain valve located in the vicinity of the lower part of the ring and communicating into the duct.

10. The device of claim 1, wherein the duct is adapted for transmitting air and the first fluid is air.

11. The device of claim 1, wherein the radiator is adapted for transmitting liquid coolant and the second fluid is a liquid coolant.

12. The device of claim 1, wherein the first duct is adapted for transmitting air and the first fluid is compressed air.

13. The device of claim 12, further comprising an air compressor connected to the inlet connection; and air tanks connected to the outlet connection.

14. The device of claim 13, further comprising an air dryer between the outlet connection and the air tanks.

15. The device of claim 1, wherein the engine includes a a vehicle brake supply circuit, the duct being in the brake supply circuit.

16. The device of claim 15, wherein the engine further includes an engine cooling system and the radiator being part of the cooling system.

17. The device of claim 16, further comprising an air compressor connected to the inlet connection; and air tanks connected to the outlet connection.

18. The device of claim 17, wherein the duct is part of a separate unit which is mounted to the fan ring.

19. A device for cooling a fluid for an internal combustion engine, the device comprising:

a radiator adapted to cool a first fluid for the engine, connections to the radiator for communicating the first fluid to the engine; the radiator and the connections to the radiator being in a first flow circuit;

a fan operable for generating an air flow and the fan being supported for directing the air flow over the radiator; the fan having a periphery;

a fan ring arranged around the periphery of the fan, the ring being shaped and positioned for directing air flow through the fan;

at least one duct located at and directed along the fan ring;

an inlet connection to the duct, an outlet connection from the duct spaced along the duct away from the inlet connection, the inlet and outlet connections being so spaced and the duct being so positioned on the fan ring that a second fluid conveyed along the duct from the inlet connection to the outlet connection may be cooled by the air flow past the fan ring;

the duct and the inlet and the outlet connections to the duct being in a second flow circuit separate from the first flow circuit and separating the flows of the first and second fluids.

* * * * *